United States Patent
Marutani et al.

(10) Patent No.: US 8,418,673 B2
(45) Date of Patent: Apr. 16, 2013

(54) FUEL INJECTION METHOD FOR DIESEL ENGINE AND DIESEL ENGINE

(75) Inventors: Youichi Marutani, Tokyo (JP);
Yasunori Ashikaga, Tokyo (JP);
Takayuki Yamada, Tokyo (JP);
Mamoru Kurashina, Matsumoto (JP)

(73) Assignee: IHI Corporation, Tokyo (JP)

( * ) Notice: Subject to any disclaimer, the term of this patent is extended or adjusted under 35 U.S.C. 154(b) by 402 days.

(21) Appl. No.: 12/808,379

(22) PCT Filed: Nov. 5, 2008

(86) PCT No.: PCT/JP2008/003178
§ 371 (c)(1),
(2), (4) Date: Jun. 16, 2010

(87) PCT Pub. No.: WO2009/078119
PCT Pub. Date: Jun. 25, 2009

(65) Prior Publication Data
US 2011/0155101 A1    Jun. 30, 2011

(30) Foreign Application Priority Data
Dec. 17, 2007 (JP) .................................. 2007-324646

(51) Int. Cl.
*F02B 15/00* (2006.01)
*F02B 17/00* (2006.01)

(52) U.S. Cl.
USPC .......................................... 123/305; 123/298

(58) Field of Classification Search ............... 123/305, 123/295, 298, 301, 263, 290, 306; 701/103, 701/104
See application file for complete search history.

(56) References Cited

U.S. PATENT DOCUMENTS

| | | | |
|---|---|---|---|
| 2,748,757 A | 6/1956 | Morris | |
| 7,726,282 B2 * | 6/2010 | Ashizawa | 123/435 |
| 2004/0011324 A1 * | 1/2004 | Arndt et al. | 123/299 |
| 2004/0244786 A1 * | 12/2004 | Van Wyk | 123/657 |

FOREIGN PATENT DOCUMENTS

| | | |
|---|---|---|
| DE | 891 767 | 10/1953 |
| FR | 857 909 | 10/1940 |
| JP | 57-110718 A | 7/1982 |
| JP | 61-207816 A | 9/1986 |
| JP | 61-58649 B2 | 12/1986 |

(Continued)

OTHER PUBLICATIONS

U.S. Appl. No. 12/747,646, filed Jun. 11, 2010, Marutani, et al.

(Continued)

*Primary Examiner* — Mahmoud Gimie
(74) *Attorney, Agent, or Firm* — Oblon, Spivak, McClelland, Maier & Neustadt, L.L.P.

(57) ABSTRACT

In a diesel engine including a fuel injection valve for injection of fuel into a combustion chamber to produce sprays in the chamber, an axis of the valve is deviated radially outwardly of an axis of a cylinder, so that the valve is positioned close to an inner periphery of the cylinder. Nozzle holes of the valve are grouped into two groups with respect to a line formed by connecting, in plan view, the axis of the valve with the axis of the cylinder. The sprays injected from the nozzle holes advance in a fan-like manner in the plan view and strike against the inner periphery of the cylinder on a side away from the valve.

7 Claims, 3 Drawing Sheets

FOREIGN PATENT DOCUMENTS

| | | |
|---|---|---|
| JP | 5-59352 U | 9/1993 |
| JP | 5-80566 B2 | 11/1993 |
| JP | 2570996 Y2 | 2/1998 |
| JP | 10-227218 A | 8/1998 |
| JP | 10-252608 A | 9/1998 |
| JP | 2000-516687 | 12/2000 |
| JP | 3191562 B2 | 5/2001 |
| JP | 2003-172144 A | 6/2003 |
| JP | 2004-92496 A | 3/2004 |
| JP | 2004-92586 | 3/2004 |
| JP | 2007-255291 A | 10/2007 |
| KR | 2002-0042886 | 6/2002 |
| WO | WO 92/13190 | 8/1992 |
| WO | WO 2008015536 A1 * | 2/2008 |

OTHER PUBLICATIONS

Extended European Search Report issued on Apr. 8, 2011 in Application No. 08861302.1.

* cited by examiner

FUEL INJECTION METHOD FOR DIESEL ENGINE AND DIESEL ENGINE

TECHNICAL FIELD

The present invention relates to a diesel engine, and a fuel injection method for a diesel engine.

BACKGROUND ART

In a diesel engine, a fuel injection valve is usually arranged at a cylinder head and on an extension of an axis of a cylinder. An example of such conventional diesel engine is shown in FIGS. 1 and 2. In the figures, reference numeral 1 denotes a diesel engine which comprises a cylinder 2, a piston 3 slidably arranged in the cylinder 2 for vertically reciprocal movements, a fuel injection valve 5 mounted on a cylinder head 4, and openable and closable suction and exhaust valves (not shown) mounted on the cylinder head 4, a portion of the cylinder chamber above the piston 3 providing a combustion chamber 6.

The fuel injection valve 5 has a lower end formed with 4-6 nozzle holes which are arranged circumferentially and substantially equidistantly. An axis L1 of the fuel injection valve 5 is substantially on an extension of an axis L2 of the cylinder 3.

In the above-mentioned diesel engine 1, when the piston 3 reaches a vicinity of an upper dead center during a compression stroke, fuel is injected from the fuel injection valve 5 radially in a plan view into atomization in a combustion chamber 6 to produce sprays 7. To inject the fuel radially in the plan view is for prevention of the produced sprays 7 from being interfered with each other into formation of excessively rich portions of the sprays 7 and thus for prevention of combustion failure.

The sprays 7 radially injected into the combustion chamber 6 take in air supplied from the suction valve into the cylinder 2 and advance to and strike against an inner periphery of the cylinder 2, so that the sprays 7 change their advancing directions to advance along the inner periphery of the cylinder 2 and collide with the sprays 7 from the opposite direction along the inner periphery of the cylinder 2 into a fuel-air mixture which burns by attaining its ignition temperature through compression of the combustion chamber 6.

There are various prior art literatures for a diesel engine. A diesel engine with an axis of a fuel injection valve being on an extension of an axis of a piston is shown, for example, in Patent Literatures 1 and 2.
[Patent Literature 1] JP 2003-172144A
[Patent Literature 2] JP 10-227218A

SUMMARY OF INVENTION

Technical Problems

In the diesel engine 1 shown in FIGS. 1 and 2, the sprays 7 of fuel injected from the fuel injection valve 5 take in air before they reach the inner periphery of the cylinder 2. The sprays 7 having reached the inner periphery of the cylinder 2 move circumferentially, as shown in FIG. 2, along the inner periphery of the cylinder 2 to collide and admix with the sprays 7 from the circumferentially opposite direction.

However, when an axis L1 of the fuel injection valve 5 is on an extension of an axis L2 of the cylinder 2, a distance from the fuel injection valve 5 to the inner periphery of the cylinder 2 is short in length and the circumferentially advancing distances of the sprays 7 along the inner periphery of the cylinder 2 are also short in length. Thus, the sprays 7 of fuel injected from the fuel injection valve 5 and reaching and advancing along the inner periphery of the cylinder 2 fail in taking in sufficient air before the collision; as a result, the sprays 7 burn with insufficient oxygen to bring about combustion failure to thereby increase particulate matters (PM).

In the diesel engine 1 as shown in FIGS. 1 and 2, where a combustion chamber is provided for the piston 3, the distance from the fuel injection valve 5 to the inner periphery of the combustion chamber for the piston 3 is further shortened in length, so that intake of air into the sprays 7 becomes further insufficient and the combustion failure becomes further remarkable.

Patent Literature 1 is to suppress production of soot and nitrogen oxides by sufficiently diffusing fuel sprays within a combustion chamber even if the fuel is injected in a vicinity of a top dead center. Patent Literature 2 is to prevent interference of sprays from main and auxiliary injection holes during a high load operation so as to prevent smoke degradation. Thus, both of the Patent Literatures 1 and 2 have no direct relevance to the invention.

The invention was made in view of the above and has its object to provide a fuel injection method for a diesel engine and a diesel engine capable of conducting sufficient intake of air in fuel sprays injected from a fuel injection valve so as to prevent combustion failure.

Solution to Problems

The invention is directed a fuel injection method for a diesel engine with fuel being injected from a fuel injection valve into a combustion chamber for production of sprays, comprising injecting the fuel to produce sprays by the fuel injection valve deviated radially outwardly of the cylinder into a position close to an inner periphery of the cylinder, the sprays advancing in a fan-like manner in a plan view to strike against the inner periphery of said cylinder on a side away from the deviated fuel injection valve.

In a fuel injection method for a diesel engine according to the invention, predetermined ones of the sprays striking against and advancing circumferentially along the inner periphery of said cylinder collide and interfere with the other sprays striking against and advancing along the inner periphery of the cylinder in the direction opposite to the first-mentioned sprays.

In a diesel engine according to the invention with fuel being injected from a fuel injection valve into a combustion chamber for production of sprays, said fuel injection valve is deviated radially of the cylinder into a position close to an inner periphery of said cylinder.

In a diesel engine of the invention, nozzle holes of said fuel injection valve are grouped into two groups with respect to a line connecting an axis of said injection valve with an axis of the cylinder in a plan view, the respective nozzle holes being arranged in a fan like manner in a plan view, tips of the respective nozzle holes being directed to the inner periphery of the cylinder on a side away from the fuel injection valve.

In a diesel engine according to the invention, an upper surface of a piston in said cylinder has a falling gradient from a side close to the fuel injection valve to a side away from the fuel injection valve.

Advantageous Effects of Invention

According to a fuel injection method for a diesel engine and a diesel engine of the invention, the fuel injection valve is deviated with respect to the cylinder, so that the distance from the fuel injection valve to the inner periphery of the cylinder and the circumferential distances along which the sprays flow can be made sufficiently prolonged, so that the sprays of fuel injected from the fuel injection valve reach and advance along the inner periphery of the cylinder, and take in and admix with sufficient air before the collision and the interference with each other. As a result, the combustion of the sprays is conducted in cooperation with an enough amount of evenly dispersed oxygen, so that combustion state becomes satisfactory to reduce particulate matters (PM).

In a diesel engine of the invention, the piston has a falling gradient in an advancing direction of the sprays, so that the sprays hardly adhere to the surface of the piston and enough distances can be afforded before the strike of substantially all of the sprays against the inner periphery of the cylinder, thereby attaining further favorable actions and effects.

Figure 1:
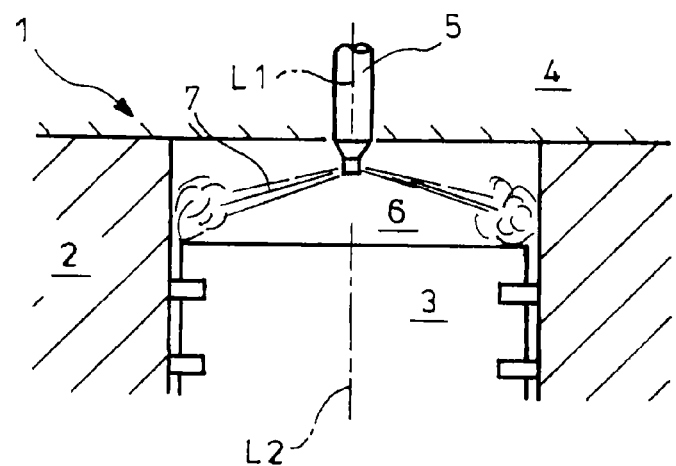
FIG. 1 is a front view in section of a conventional diesel engine.

REFERENCE SIGNS LIST 1 diesel engine
2 cylinder
3 piston
5 fuel injection valve
5a nozzle hole
6 combustion chamber
7 spray
L1 axis
L2 axis
L3 line

DESCRIPTION OF EMBODIMENTS

Embodiments of the invention will be described in conjunction with the attached drawings.

Figure 2:
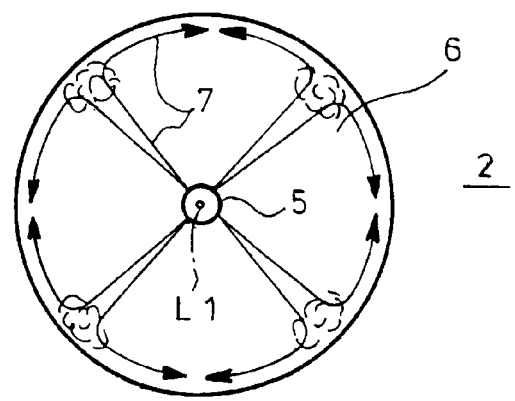
FIG. 2 is a plan view of FIG. 1.
Figure 3:
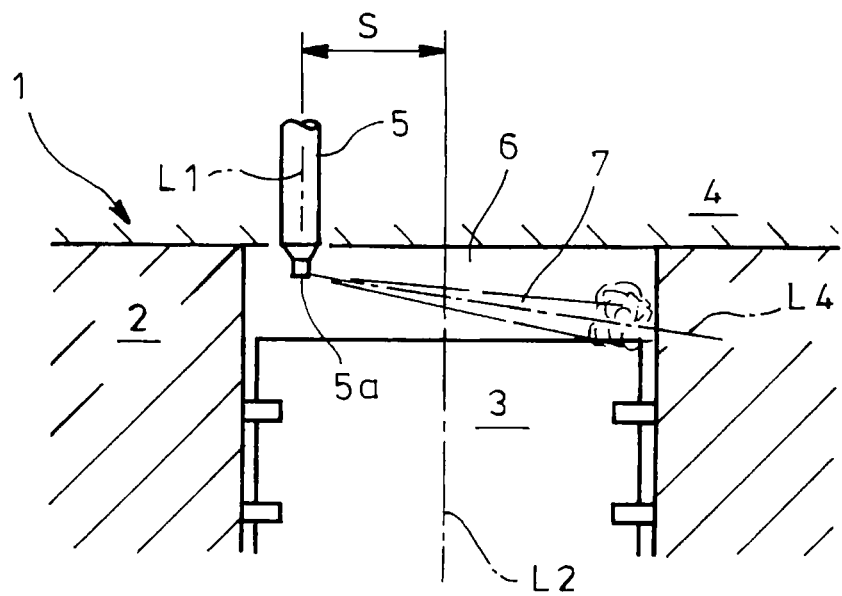
FIG. 3 is a front view in section of an embodiment of a fuel injection method for a diesel engine and a diesel engine according to the invention.
Figure 4:
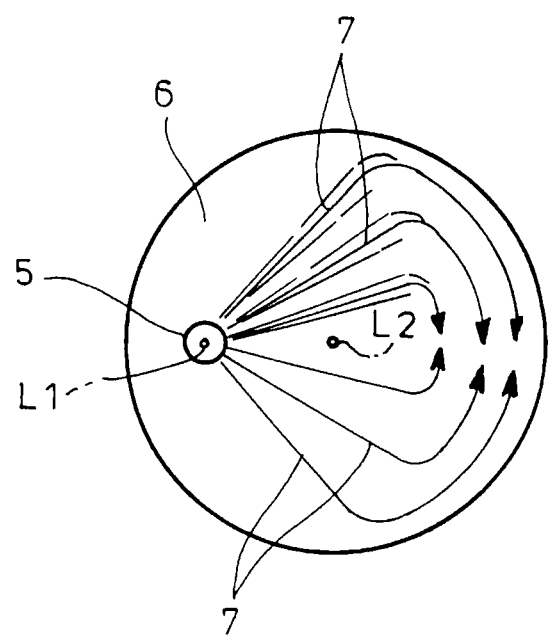
FIG. 4 is a plan view of FIG. 3.
Figure 5:
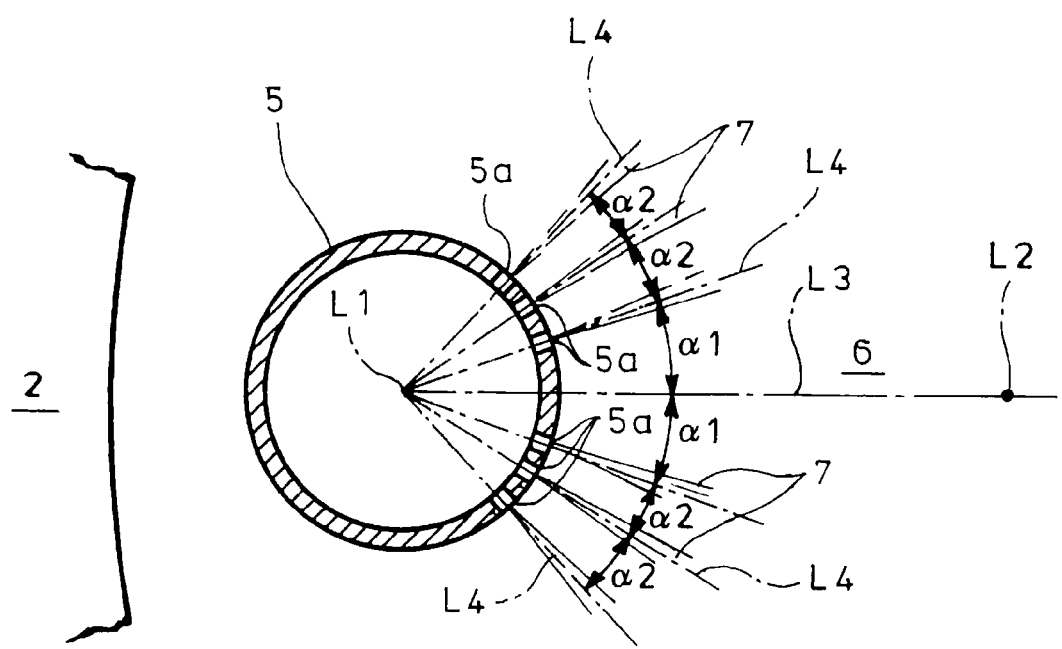
FIG. 5 is a partially enlarged horizontal section of the nozzle holes in the fuel injection valve shown in FIG. 4.

FIGS. 3-5 show an embodiment of the invention. In the figures, parts similar to those in FIGS. 1 and 2 are represented by the same reference numerals.

The embodiment illustrated is characteristic in that an axis L1 of a fuel injection valve 5 is deviated with respect to an axis L2 of a cylinder 2 radially outwardly of the cylinder 2 by a distance S so that the injection valve 5 is positioned close to an inner periphery of the cylinder 2. Nozzle holes 5a of the fuel injection valve 5 are grouped into two with respect to line L3 connecting the axis L1 with the axis L2 as shown in FIG. 5 in a plan view, each of the groups having 1-3 nozzle holes (each group has 3 nozzle holes in the figure shown).

When the nozzle holes 5a of the fuel injection valve 5 are grouped into two groups each with three holes as shown in FIG. 5, an angle $\alpha 1$ from line L3 to an axis L4 of the nozzle hole 5a positioned most close to Line L3 is about 20° and an angle $\alpha 2$ between the adjacent nozzle holes 5a in each of the groups is about 20°. When the nozzle holes 5a are grouped with respect to line L3 into two groups each with single hole, the angle $\alpha 1$ from line L3 to the axis L4 of each of the nozzle holes 5a is about 30°-45°; with two groups each with two nozzle holes 5a, the angle $\alpha 1$ from line L3 to an axis L4 of the nozzle hole 5a positioned close to Line L3 is about 25° and the angle $\alpha 2$ between the adjacent nozzle holes 5a in each of the groups is about 25°. That is, in the fuel injection valve 5 of the embodiment, the axis L4 of any nozzle hole 5a makes an acute angle with Line L3 in the plan view; an arrangement of the nozzle holes 5a as a whole is in the form of fan; and tips of the nozzle holes 5a are directed to the inner periphery of the cylinder 2 on a side away from the fuel injection valve 5.

In a side view, each of the axes L4 of the nozzle holes 5a has a falling gradient toward a side of the inner periphery of the cylinder 2 where the sprays 7 strike.

Next, a mode of operation of the above embodiment will be described.

In the diesel engine 1 shown, the sprays 7 of fuel injected from two grouped nozzle holes of the fuel injection valve 5 in two directions advance divergently in fan-like manner as shown in FIG. 2 in the plan view and take in air before reaching the inner periphery of the cylinder 2. The sprays 7 having reached the inner periphery of the cylinder 2 advance circumferentially along the inner periphery of the cylinder 2 as shown in FIG. 4 and collide with the other sprays 7 having reached circumferentially from the opposite direction to intervene and intermingle with each other.

In the embodiment shown, the fuel injection valve 5 is deviated with respect to the cylinder 2 by a distance S, so that a distance from the fuel injection valve 5 to the inner periphery of the cylinder 2 where the sprays 7 strike and circumferential distances along which the sprays 7 flow can be made sufficiently prolonged. Thus, the sprays 7 of fuel injected from the fuel injection valve 5 reach and advance along the inner periphery of cylinder 2 and can take in and admix with sufficient air before the collision. As a result, the sprays 7 burn in cooperation with an enough amount of evenly dispersed oxygen, so that the combustion state becomes favorable to reduce particulate matters (PM).

Figure 6:
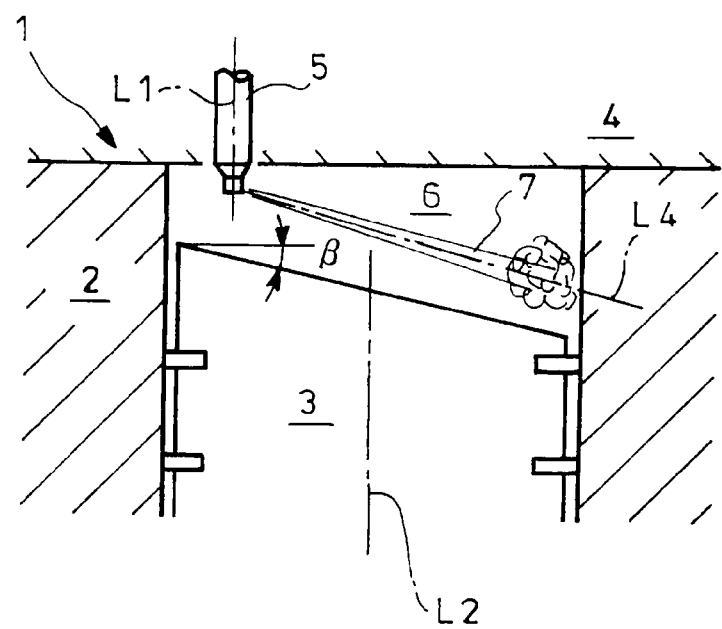
FIG. 6 is a front view in section of a further embodiment of a fuel injection method for a diesel engine and a diesel engine according to the invention.

FIG. 6 shows a further embodiment of the invention. The diesel engine 1 of this embodiment is different from the diesel engine 1 of FIGS. 3-5 in that an upper surface of the piston 3 has a falling gradient in a side view from a side close to the fuel injection valve 5 through the axis L2 of the piston 3 to an opposing side on the inner periphery of the piston 3. The upper surface of the piston 3 has a slant angle $\beta$ of about 20° or so.

This embodiment shown can also attain effects and advantages similar to those in the embodiment illustrated previously in the above; moreover, the piston 3 has a falling gradient in the advancing direction of the sprays 7, so that the sprays 7 hardly adhere to the surface of the piston 3; it can afford enough distances for the strike of substantially all of the sprays 7 against the inner periphery of the cylinder 2, which brings about further favorable actions and effects.

It is to be understood that a fuel injection method for a diesel engine and a diesel engine according to the invention is not limited to the above-mentioned embodiments and that various changes and modifications may be made without departing from the scope of the invention.

The invention claimed is:

1. A fuel injection method for a diesel engine with fuel being injected from a fuel injection valve into a combustion chamber for production of sprays, comprising:

injecting the fuel from said fuel injection valve through a plurality of nozzle holes thereof, said fuel injection valve deviated radially outwardly of the cylinder into a position close to an inner periphery of the cylinder, said nozzle holes being grouped into two groups with respect to a line connecting an axis of the fuel injection valve with an axis of the cylinder, the sprays injected from each group of nozzle holes advancing in a fan-like manner in a plan view to strike against the inner periphery of said cylinder on a side away from the deviated fuel injection valve and collide, intervene, and intermingle with the other sprays advancing from an opposite direction.

2. A fuel injection method for a diesel engine as claimed in claim 1, wherein the axis of the fuel injection valve is parallel to the axis of the cylinder.

3. A fuel injection method for a diesel engine as claimed in claim 1, wherein each axis of the nozzle holes presents an acute angle with the line connecting the axis of the fuel injection valve with the axis of the cylinder in the plan view.

4. A diesel engine with fuel being injected from a fuel injection valve into a combustion chamber for production of sprays, comprising:
said fuel injection valve deviated radially of a cylinder into a position close to an inner periphery of said cylinder, said fuel injection valve injecting the fuel through a plurality of nozzle holes grouped into two groups with respect to a line connecting an axis of the fuel injection valve with an axis of the cylinder, tips of the respective groups of nozzle holes divided by said line being directed to the inner periphery of the cylinder on a side away from the fuel injection valve.

5. A diesel engine as claimed in claim 4, wherein an upper surface of a piston in said cylinder has a falling gradient from a side close to the fuel injection valve to a side away from the fuel injection valve.

6. A diesel engine as claimed in claim 4, wherein the axis of the fuel injection valve is parallel to the axis of the cylinder.

7. A diesel engine as claimed in claim 4, wherein each axis of the nozzle holes presents an acute angle with the line connecting the axis of the fuel injection valve with the axis of the cylinder in the plan view.

\* \* \* \* \*